US 7,028,902 B2

(12) United States Patent
Xu et al.

(10) Patent No.: US 7,028,902 B2
(45) Date of Patent: Apr. 18, 2006

(54) BARCODE HAVING ENHANCED VISUAL QUALITY AND SYSTEMS AND METHODS THEREOF

(75) Inventors: Yihong Xu, Marlborough, MA (US); Henry W. Sang, Jr., Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/262,882

(22) Filed: Oct. 3, 2002

(65) Prior Publication Data
US 2004/0065739 A1   Apr. 8, 2004

(51) Int. Cl.
*G06K 7/10* (2006.01)

(52) U.S. Cl. .............................. 235/462.1; 235/462.01; 235/462.09; 235/494

(58) Field of Classification Search ............. 235/462.1, 235/462.01, 462.09, 462.11, 494, 487
See application file for complete search history.

(56) References Cited

U.S. PATENT DOCUMENTS

| | | | | |
|---|---|---|---|---|
| 4,590,366 | A | * | 5/1986 | Rothfjell ..................... 235/494 |
| 4,777,357 | A | * | 10/1988 | Harada et al. .......... 235/462.27 |
| 4,889,367 | A | * | 12/1989 | Miller ......................... 283/88 |
| 5,109,153 | A | * | 4/1992 | Johnsen et al. .............. 235/468 |
| 5,337,361 | A | * | 8/1994 | Wang et al. .................. 380/51 |
| 5,479,588 | A | * | 12/1995 | Sawada et al. ............. 358/1.18 |
| 5,563,399 | A | | 10/1996 | Wang ......................... 235/462 |
| 5,691,773 | A | * | 11/1997 | Wang et al. ................. 348/249 |
| 5,760,382 | A | | 6/1998 | Li et al. ...................... 235/436 |
| 5,988,897 | A | * | 11/1999 | Pierce et al. ................... 400/61 |
| 6,030,001 | A | | 2/2000 | Kruckemeyer ............... 283/70 |
| 6,446,868 | B1 | * | 9/2002 | Robertson et al. ........ 235/462.1 |
| 6,561,428 | B1 | * | 5/2003 | Meier et al. ........... 235/462.25 |
| 6,655,579 | B1 | * | 12/2003 | Delman et al. ............. 235/375 |
| 2001/0047476 | A1 | | 11/2001 | Yen et al. | |

FOREIGN PATENT DOCUMENTS

EP   1158456   11/2001

* cited by examiner

*Primary Examiner*—Steven S. Paik

(57) ABSTRACT

A barcode with enhanced visual quality may be used with an item such as a document. The barcode includes a background field having an embedded graphic. The background caries data related to the item. The embedded graphic may obscure some background data. A bar coding apparatus, system and a corresponding method involve two basic functions: encoding and decoding. The encoding function uses an encoding algorithm to generate the barcode. The graphic is then embedded onto the barcode and the thus-generated enhanced visually significant barcode is placed on the item. Decoding involves machine-reading the barcode using a decoding algorithm. The decoding algorithm can operate with or without an original bit map that was used to generate the graphic. The graphic may be enhanced in a manner that may make at least a portion of the encoded information within the graphic readable by a human.

34 Claims, 8 Drawing Sheets

BARCODE HAVING ENHANCED VISUAL QUALITY AND SYSTEMS AND METHODS THEREOF

TECHNICAL FIELD

The technical field relates to systems and methods for using visually significant barcodes.

BACKGROUND

Graphical patterns may be used to convey information. A pattern may be printed or otherwise affixed to an item such as a document or an article of manufacture, for example. The pattern can then be used for various control and monitoring functions by using equipment to read the barcode. One such pattern is a barcode, and the most common barcodes are one-dimensional, meaning the barcode pattern varies in only one direction (e.g., the horizontal direction) and are fixed or constant in other dimensions (e.g., the vertical dimension). One-dimensional barcodes are used in applications that do not require a great deal of information to be conveyed by the barcode. An example of such low-information applications is bar coding of consumable and food products sold through food stores. One-dimensional barcodes are rendered by machines, and are read by machines. The (typically) alternating thicker and thinner vertical bars that comprise the one-dimensional barcode are not susceptible to interpretation by a human. That is, a human cannot derive any information by viewing a one-dimensional barcode.

Two-dimensional barcodes are known that can be used to provide more information than one-dimensional barcodes. Two-dimensional barcodes use intricate patterns that vary in both the horizontal and vertical directions. An exemplary two-dimensional barcode system is described in U.S. Pat. Nos. 5,060,980, 5,486,686, and 5,459,307. This system uses bars that are oriented out of the vertical plane e.g., the bars are slanted at 45 degrees from the vertical. The resulting two orientations of the bars allow information to be encoded within the bars.

Visually significant barcodes improve on two-dimensional barcodes by allowing more complex patterns to be encoded within the barcode. However, such visually significant barcodes have a low resolution, making the visually significant barcode coarse and grainy, thereby rendering the visually significant barcode difficult to read by a human. Furthermore, these visually significant barcodes require the original bit map used to generate the barcode in order to decode the visually significant barcode. Thus, current visually significant barcodes cannot be effectively used for many data and document control functions.

SUMMARY

What is disclosed is a barcode with enhanced visual quality, having a background and a foreground graphic embedded in the background. The embedded graphic creates blackout regions on the background. Mechanisms are then provided for determining the blackout regions.

Also disclosed is a method for use with an item that incorporates an enhanced visually significant barcode. The method begins by creating a two-dimensional barcode having data related to the item. Next, a graphic is overlaid on the two-dimensional barcode, thereby forming the enhanced visually significant barcode. The enhanced visually significant barcode is then placed on the item.

Further, what is disclosed is an apparatus that uses an enhanced visually significant barcode with an item. The apparatus acquires data related to the item, and incorporates the data into the enhanced visually significant barcode. The apparatus also obtains a graphic to be incorporated into the enhanced visually significant barcode, encrypts the data and the graphic, and converts the encrypted data and graphic, thereby producing the enhanced visually significant barcode with the graphic overlaying the data; notes a location of the graphic, and places the enhanced visually significant barcode on the item.

Still further, what is disclosed is a system that encodes and decodes an enhanced, visually significant barcode, the system including a first dataset having data related to an item, a second dataset having an identifiable graphic, and an encoding device coupled to the first and the second datasets, the encoding device producing a merged dataset with the graphic overlaid on the data, the overlaid graphic obscuring a portion of the data. The merged dataset is then the enhanced, visually significant barcode. The system also includes mechanisms for indicating the portion of the data obscured by the overlaid graphic and a decoder that reads the merged dataset and separates the second dataset from the first dataset using the indicating mechanisms.

DESCRIPTION OF THE DRAWINGS

The detailed description refers to the following drawings, in which like numerals refer to like elements, and in which.

DETAILED DESCRIPTION

A barcode with enhanced visual quality, and a method, system, and apparatus for using the barcode with enhanced visual quality are disclosed. The apparatus, system, and method allow combining two or more sets of digital data, and rendering the digital datasets in ways that allow a machine, a human, or both to extract information from the rendered digital datasets. The barcode with enhanced visual quality may be used in conjunction with an item, such as a document, for example.

Figure 1:
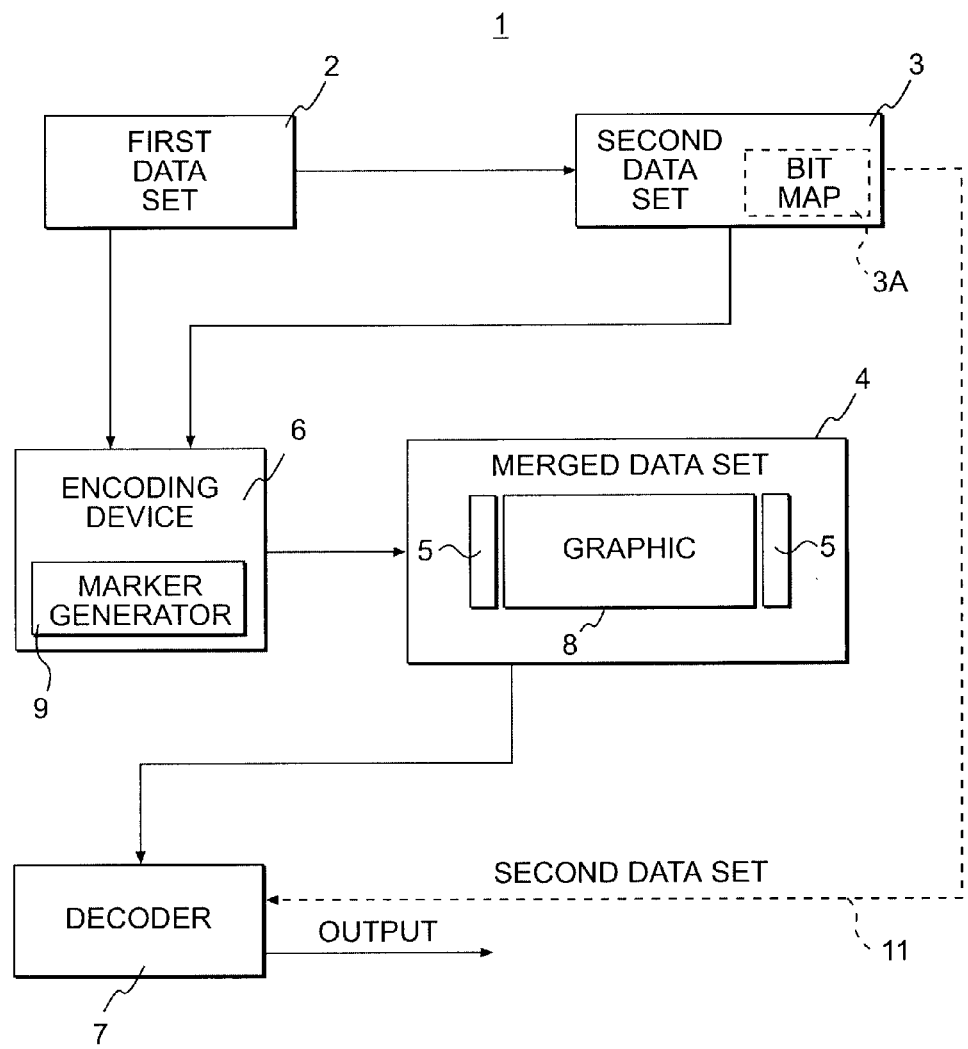
FIG. 1 illustrates use of digital datasets, including graphical data, to convey information.

FIG. 1 shows a data system 1 that includes a first digital dataset 2 that can be combined with a second digital dataset 3 to produce a combined, or merged, dataset 4. The first dataset 2 may encode a message. The second dataset 3 may encode an identifiable graphic 8. The second dataset 3 is coupled to the first dataset 2 in a manner that may obscure or overwrite individual data elements in the first dataset 2. The identifiable graphic 8 can be identified by a machine only, by a human visual system, or by both the machine and the human visual system.

In an embodiment, the first dataset 2 may be coupled to the second dataset 3 using markers 5 to indicate locations where data elements in the first dataset 2 are, or will be, obscured. In this embodiment, an encoding device 6, using a marker generator 9, generates the markers 5, based on the second dataset 3. Alternatively, the markers 5 are included with the second dataset 3. A decoder 7 reads the markers 5 to extract the second dataset 3 from the merged dataset 4. In an alternative embodiment, the second dataset 3 is known to, or is accessible by, the decoding device 7 (shown for illustrative purposes by optional second data set data path 11), which can then separate the second dataset 3 from the first dataset 2. For example, the second dataset 3 may include a bit map 3A that defines the graphic 8. The decoder 7 can then provide an output equivalent to the data in the first dataset 2.

In the preceding discussion, and in the discussion that follows, the method, system, and apparatus will be described with reference to two datasets. However, the method, system and apparatus are not limited to use of only two datasets, and any number of datasets may be used.

The digital datasets 2 and 3, when combined and rendered, may produce identifiable patterns. Such patterns may be identified, and intelligence derived from such identification, by a machine or human, or both. In an embodiment, the digital datasets comprise a barcode, such as a two-dimensional barcode as the first dataset 2, and a visually identifiable graphic, such as a human signature, a logo, a drawing, or a photograph as the second dataset 3, for example.

A two-dimensional barcode may be used to convey information related to the object to which the barcode is affixed. In an example in which the barcode is affixed to a document, the barcode may include information that identifies the document, such as a code, or other index mechanism, an origin of the document, such as author information, date of document creation, and other information. The barcode also can be used to embed a variety of data, such as a signature, an identification code, a universal resource locator (URL) code, encrypted or unencrypted data, and a logo and other graphics. The barcode, according to an embodiment, provides the advantage of providing human-readable data. In the example of a signature, a human may read and recognize the signature as a human signature. As will be described later, the barcode may also include data that can be used to identify a possible forging of the document, for example.

Information or data to be included in the barcode may be input manually. Alternatively, the encoding device 6 may generate the barcode data based on analysis of the item to which the barcode is to be affixed. For example, the encoding device may include an analysis engine that analyses an electronic version of a document and generates the barcode based on the analysis.

An exemplary bar coding system and a corresponding method involve two basic functions: encoding and decoding. The encoding function uses an encoding algorithm to generate the barcode and places the thus-generated barcode on an item. Decoding involves machine-reading the barcode using a decoding algorithm. The decoding algorithm can operate with or without an original bit map that was used to generate the barcode. In addition, the barcode may be enhanced in a manner that makes at least a portion of the encoded information within the barcode readable by a human.

The barcode, hereafter referred to as an enhanced visually significant barcode (EVSBC), can be encoded with a black and white graphic embedded into a gray/white background (using a gray color for bit 1 and white for bit 0, for example). The EVSBC can also be encoded using a color background to improve visual quality or to increase data density. In general, use of the gray/white background, or use of the color background, allows the graphic (i.e., the foreground) to stand out visually from the background (i.e., the barcode). As noted above, the encoding process may also add synchronization marks (e.g., the markers 5 shown in FIG. 1) to the embedded graphic. The synchronization marks are then used in the decoding process. Examples of the synchronization marks include embedded graphical information located at a top part of the EVSBC that can be decoded before starting the decoding process for the embedded graphic, dot patterns located around edges of the embedded graphic, and random spatial scattering of information in the background. Use of the synchronization marks according to one or more of the above methods helps reduce localizing errors during the decoding process.

For decoding the EVSBC, a first decoding method assumes an original graphic bit map, such as the bit map 3A shown in FIG. 1, is available. The original graphic bit map is then used as an anchor to locate and synchronize an embedded bit-stream (e.g., a signature) for reliable data retrieval. More specifically, the graphic may be located, or overlaid, at a specific starting point of the barcode. The starting point may be determined by the encoding device 6, or may be specified as part of the data comprising the bit map. The bit map itself may be defined as a series or sequence of data points, each having a unique x-y relationship to the starting point. With the starting point and the x-y relationships known, the decoder 7 can read the bit map to "separate" the bit map from the background barcode. That is, the decoder 7 does not attempt to read any barcode data from the area defined by the bit map. To implement this method, the decoder 7 may have access to the original bit map, either by accessing a database containing the original bit map, such as the dataset 3 shown in FIG. 1, or by accessing a separate database (not shown) containing a copy of the original bit map. A method for decoding the EVSBC using a bit map is shown in detail in FIG. 7.

A second decoding method does not require use of the original graphic bit map. Instead, a more elaborate mechanism is used to separate the embedded foreground data (i.e., the graphic) from the background data (i.e., the barcode). A color detection algorithm may be used to perform a first separation step, assigning black, gray or white to each block in an n×m matrix. The structure of such n×m matrix is described in more detail with respect to FIG. 4. Next, error correcting code is used to correct some or all color detection errors in accordance with procedures that are well known in the art. Since printers, scanners and copiers introduce noise into the EVSBC, most color errors will occur around edges of the embedded graphic. As a result, the decoding process can use synchronization marks to assure the embedded graphic is read correctly. The method for decoding the EVSBC using synchronization marks is described in more detail with respect to FIG. 7.

Use of the EVSBC is especially useful in the context of digital signatures. The computer software market is exploding with a new breed of applications targeted towards electronic commerce transactions and digital content distribution across networks. Transactions performed across networks such as the Internet, especially electronic commerce transactions, must have enough security measures to ensure that theft and abuse are minimized. One such security measure widely employed to provide security for network transactions is public key cryptography.

In public key cryptography, two different keys, namely, a "public" key and a "private" key are used to encode messages. With knowledge of the public key, a user may encrypt a message, but without knowledge of the private key, another user cannot decrypt the same message. In a transaction, the originator of the message and recipient agree on a particular public key cryptography system to use, such as the widely used Rivest, Shamir, and Adleman (RSA). Then the recipient sends the originator his public key with which the originator encrypts the message. Next, the encrypted message is sent over the network to the recipient who uses his private key to decrypt the message.

Another mechanism that is utilized in network transactions is the digital signature, which authenticates or verifies that the message sent could have only originated from the signatory. The originator forms a digital signature by passing the data to be signed (e.g., a computer file or document) through a one-way hash function and then encrypting the resulting hash value using the private key of the originator. The originator then sends the data, the public key of the originator, and the digital signature to the recipient. The recipient passes the received data through the same one-way hash function obtaining a hash value. The recipient then decrypts the digital signature with the public key of the originator and recovers the hash value. If the recovered hash value matches the hash value the recipient generated, the signature is valid. Though this and other public key digital signature protocols guarantee a level of authenticity and security for the digital signature, these protocols do not have a mechanism for binding the purpose of a digital signature along with the signature so that the signature is not used for an improper purpose.

For many electronic commerce and digital content distribution applications, there is a requirement not only to generate and verify digital signatures, but also to control and enforce the purpose for which a digital signature was generated and verified. For instance, in an electronic commerce transaction, when a bank "signs" a purchase order of a credit card holder that it serves and submits it to the merchant, the bank may want to limit its authorization of the credit card to a set amount to prevent any overcharging of the account.

While the digital signature mechanism works well in many contexts to ensure security of data and transactions, the actual digital signature is only useful in the electronic universe. In the actual world inhabited by humans, the digital signature is unrecognizable, and cannot be interpreted. However, embedding a signature as a foreground graphic image in a barcode allows the signature to perform its customary, electronic universe function, and at the same time provides a human-readable display. As with efforts to deter counterfeiting of currency, electronic measures may require supplementation with human measures (e.g., the human visual system) to reduce or eliminate fake transmissions.

Figure 2:
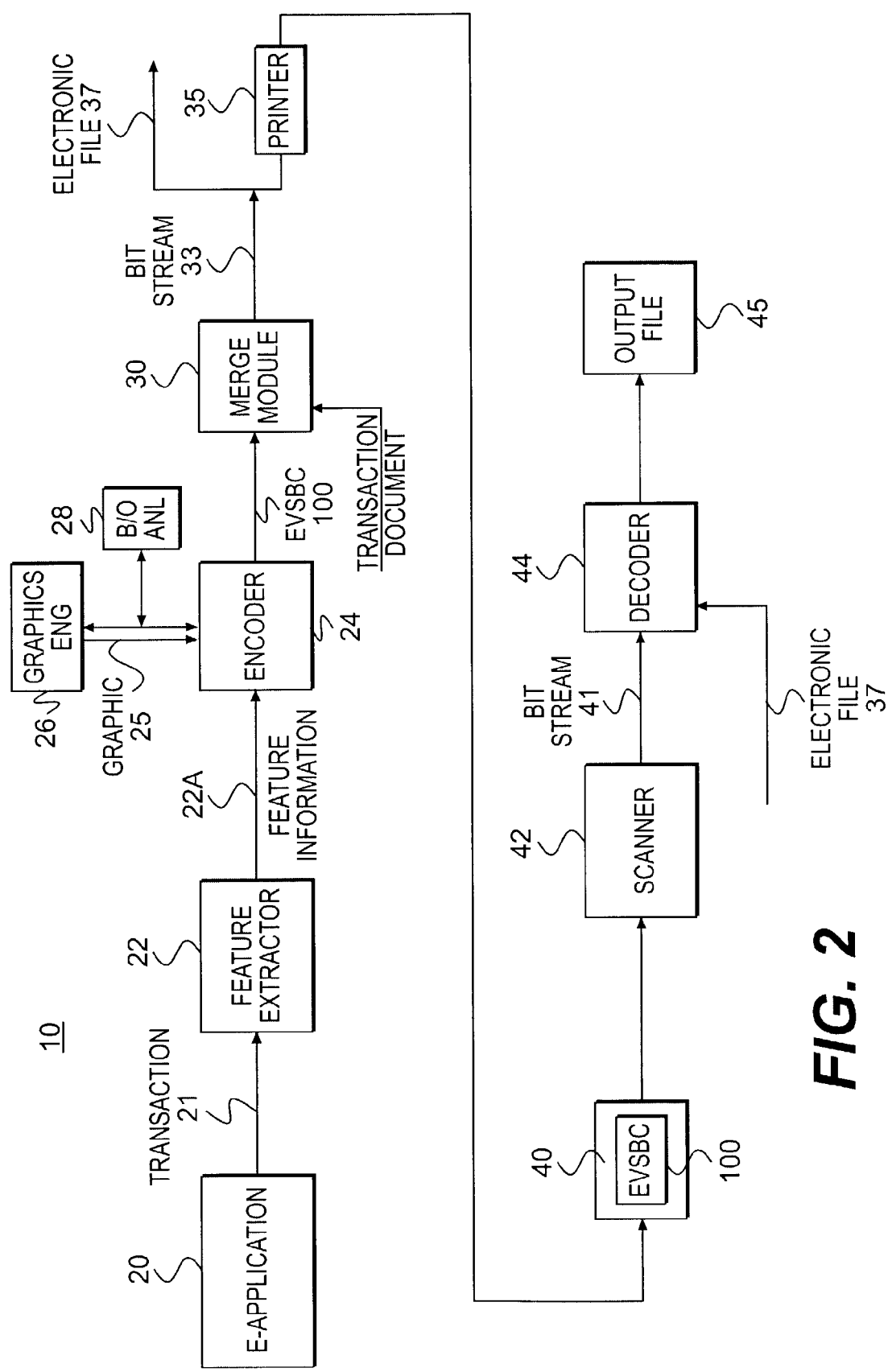
FIG. 2 illustrates an exemplary system that uses an enhanced visually significant barcode (EVSBC)

FIG. 2 illustrates an exemplary system 10 that uses an EVSBC 100. The system 10 includes an e-application 20. The e-application 20 may be any application, including an application in which authenticity of documentation is necessary. For example, the e-application 20 may relate to an on-line banking operation. In this example, the e-application 20 may operate from an Internet Web site. In another embodiment, the e-application 20 may exist at a node in a local area network (LAN) or wide area network (WAN). The e-application 20 may also be used in any network capable of transmitting digital data, including wireless networks. The e-application 20 provides transactions 21 to a feature extractor 22. In an embodiment, the transactions 21 may be transaction documents. The feature extractor 22 may identify features related to the transactions 21 that can be digitized and included in the EVSBC 100. The transactions 21 and extracted feature information 22A are provided to an encoder 24. Also coupled to the encoder 24 is a graphics engine 26 and blackout analyzer 28. The graphics engine 26 provides a visually significant graphic 25 to overlay onto a two-dimensional barcode to form the EVSBC 100. The blackout analyzer 28 determines regions of the EVSBC 100 that will be obscured, or blacked-out when the graphic 25 is overlaid on the two-dimensional barcode. The blackout analyzer 28 may determine how the blackout region will be presented to the encoder 24. For example, the blackout analyzer 28 may determine that the graphic 25 can be represented by a bit map that corresponds to the graphic 25. The bit map may exist as a file that is available for encoding and decoding purposes. Use of the bit map, and other schemes for defining blackout regions will be described in detail later.

The encoder 24 encodes the identified features, and other information, to generate the EVSBC 100. The EVSBC 100 is then provided to a merge module 30 that affixes the EVSBC 100 to the transaction document. The EVSBC 100 can then be provided with the transaction document as an electronic file 37, or may be sent to a printer 35, and a printed (hard copy) document 40 with the EVSBC 100 included may be provided.

The hard copy document 40, including the EVSBC 100 may be sent to another entity, and the EVSBC 100 decoded. For example, a scanner 42 may scan the hard copy document 40 and provide a digital bit stream 41 to a decoder 44. The decoder 44 may read and decode the digital bit stream, including the EVSBC 100. The decoder 44 then produces an output file 45, which may be an electronic file or a hard copy file, or any other type of file that is capable of storing or representing the digital data of the EVSBC 100. In addition to reading the hard copy document 40, the decoder 44 may receive the electronic file 37 for decoding.

The scanner 42 and the decoder 44 may be incorporated into standard office equipment, such as a networked personal computer, for example. The scanner 42 and decoder 44 may also be incorporated into portable devices such as a digital camera or a personal data assistant (PDA).

Figure 3A:
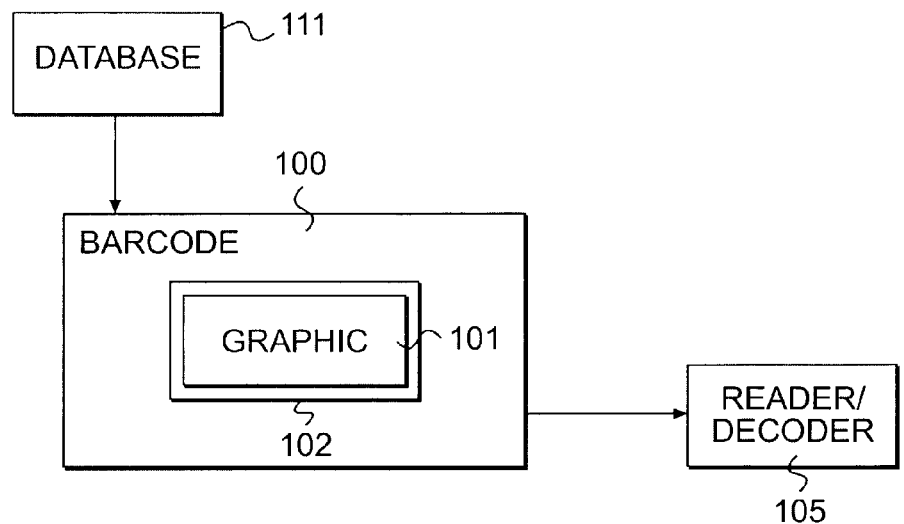
FIGS. 3A–3D illustrate embodiments for reading a barcode with graphical data.

FIG. 3A illustrates a two dimensional barcode (e.g., the EVSBC) 100 with an overlaid graphic 101. Data comprising the EVSBC may be contained in a database 111. A barcode reader and decoder 105 is used to scan and decode information contained within the barcode 100 and the graphic 101. In FIG. 3A, the graphic 101, which, for example, may be a signature, is imposed over the barcode 100. Overlaying the signature 101 on the barcode 100 will create blackout regions 102, which may appear as errors if an attempt were made to read the barcode 100. That is, when the barcode 100 is scanned, the overlaid graphic 101 obscures parts of the barcode 100. This obscuring appears to the decoder 105 as an error, and error correction software may be required to recover information from the barcode 100.

Figure 3B:
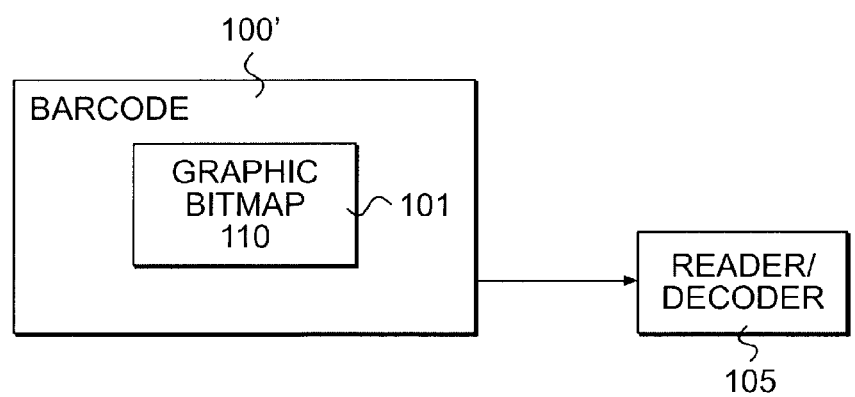
Figure 3C:
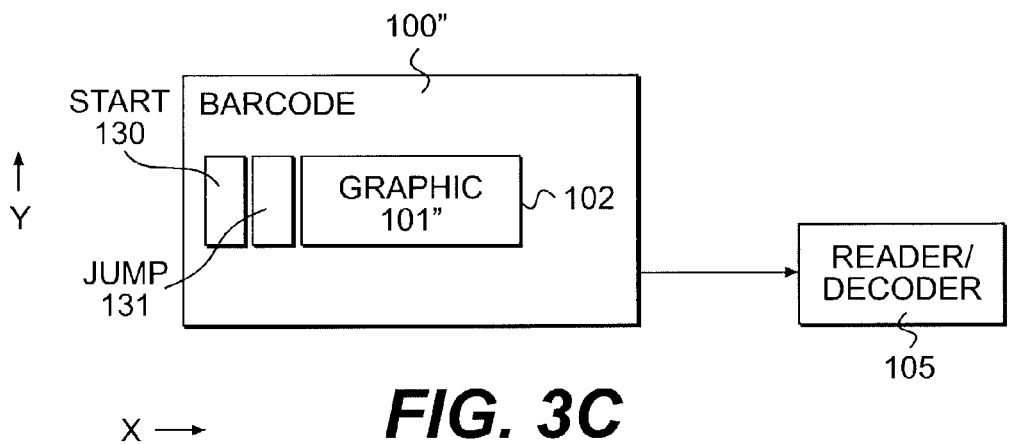
Figure 3D:
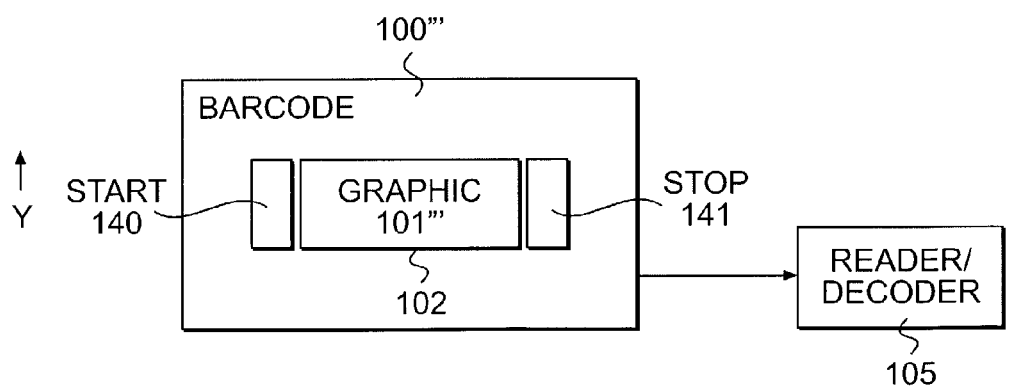

FIGS. 3B–3D illustrate different embodiments for combining a visually significant graphic with a two-dimensional barcode in order to recover as much information as possible from the barcode. In FIG. 3B, a graphic 101' is defined as a bit map 110, and the bits in the bit map 110 may be added, as digital data, to the data comprising a barcode 100'. For example, the database 111 (see FIG. 3A) may contain examples of signatures for a number of individuals. The signatures are stored in the database 111 as bit maps, and are identifiable by an identification number, or other means, for example. The decoder 105 when attempting to "read" the barcode 100' first identifies the graphic (e.g., a signature) 101' from a scan of the combined barcode 100' and graphic 101'. The decoder 105 then retrieves the bit map 110 corresponding to the graphic 101' from the database 111. The decoder 105 decodes the barcode 100', but does not attempt to read data in the areas defined by the retrieved bit map 110. By avoiding the areas defined by the bit map 110, the decoder 105 can reduce the number of detected "errors" in the read barcode, with the result that fewer data bits are required to be allocated to error correcting code (ECC). Note that random errors in the read barcode 100' may still require correction using an ECC.

FIG. 3C illustrates an alternative embodiment for reading a barcode 100". In FIG. 3C, the barcode 100" includes a synchronization mark indicating a start point 130 for a graphic 101". The start point 130 defines a beginning point for the blackout region 102 associated with the graphic 101", and the decoder 105 reading the barcode 100" will not attempt to read the barcode 100" beginning at the start point 130. Associated with the start point 130, is a jump data field 131 indicating a number of bits to "jump" from the start point 130 in order to bypass the blackout region 102 created by the graphic 101" on the barcode 100". The decoder 105 will stop reading the barcode 100" at the start point 130, and will resume reading the barcode 100" once a number of bits designated by the jump data field 131 have passed. Thus, the start point 130 and the jump data field 131 define the boundaries of the graphic 101" and show the area comprising the blackout region 102. As with the embodiment shown in FIG. 3B, using the start point 130 and the jump data field 131 eliminates "errors," which allows a greater amount of data to be allocated to the message or information in the barcode 100", and less data to be reserved for error correction. In this embodiment, the start point 130 may be defined by an x-coordinate and a y-coordinate, and the jump data field 131 may be defined by a number of bits in the x-direction and a number of bits in the y-direction.

FIG. 3D illustrates yet another embodiment for reading a barcode 100'''. In FIG. 3D, the barcode 100''' is overlaid with the graphic 101''', thereby creating blackout regions 102 that may generate "errors" that ordinarily would require correction using an ECC, for example. However, the embodiment shown in FIG. 3D uses synchronization marks comprising start points 140 and stop points 141 that indicate where the graphic 101''' is overlaid on the barcode 100'''. By reading the start points 140 and the stop points 141, the decoder 105 can stop data processing in the blackout regions 102. The start and stop points 140 and 141 may specify an x-coordinate and a y-coordinate.

In the embodiment shown in FIG. 3B, the decoder 105 must access the database 111 containing the graphic's bit map 110 in order to retrieve the bit map 110. Information contained in the barcode may indicate a location of the database 111, and the identification (location) of the bit map 110 within the database 111. In the embodiments shown in FIGS. 3C–3D, the decoder 105 need not have access to a separate data file defining the graphic. That is, the decoder 105 obtains the synchronization marks from the barcode.

The EVSBC 100 may be used to detect forgeries. In the embodiment shown in FIG. 3B, for example, the overlaid graphic 101' may represent a signature or other uniquely identifiable graphic, and the barcode 100' may be affixed to a document whose authenticity must be guaranteed. The barcode 100' may contain information related to the document, such as a number of pages of the document, for example. A would be forger may attempt to replace the signature that is overlaid on the barcode 100' with another signature. Alternatively, the forgery may take the form of copying the barcode 100' and signature onto another document. In the first alternative, replacement of the signature may lead to areas of the barcode 100' being obscured that would otherwise be readable by the decoder 105. In this case, the decoder 105 would use either the synchronization marks or the bit map to try to decode the barcode information, but the presence of the forged signature would cause the decoder to detect additional errors. Such additional error detection can be used to indicate a forgery. In the second alternative, information encoded into the barcode may be unique to the original document, but would not conform to information related to the forged document. This difference can also be used to indicate a forgery.

Figure 4:
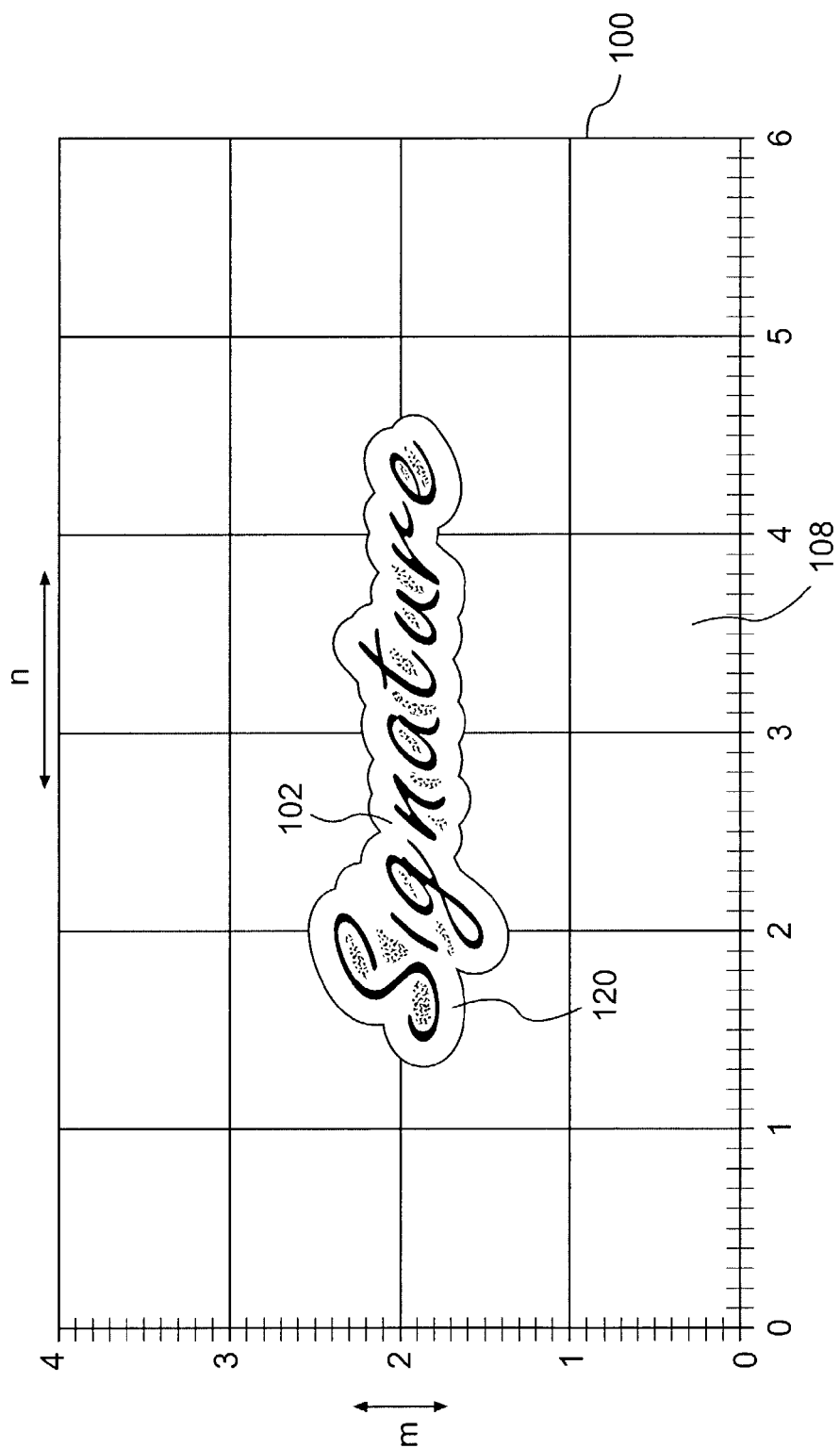
FIG. 4 illustrates an example of an EVSBC.

FIG. 4 is a graphical representation of the EVSBC 100 of FIG. 2. The EVSBC 100 includes an n×m matrix 108. The value of n and m relate to the resolution of the EVSBC 100. In an embodiment, n=m. In another embodiment, the values of m and n need not be equal. The encoding function involves using an encoding algorithm according to predefined rules to determine which of the n×m blocks can be used to embed one byte of information. By proceeding in this fashion, the EVSBC 100 can be used as a secure mechanism for providing a digital signature because potential hackers will likely not be able to substitute an imitation for an original signature bit map. The EVSBC may also be used with standard error correcting code to enhance data reliability.

Superimposed over the matrix 108 is a visually significant graphic 120, which, in the illustrated example of FIG. 4, is a signature. Thus, the EVSBC 100 includes the graphic 120 (a representation of a signature) encoded into the matrix 108. When printed on a hard copy document, the graphic 120 may be readable by a human, who can then authenticate the graphic 120.

Also shown in FIG. 4 is a blackout region 102 associated with the graphic 120. As shown in FIG. 4, the blackout region 102 need not be solid. That is, the shaded regions within the blackout region 102 represent areas in which the background barcode data are readable. More particularly, only "black" pixels, and some "white" pixels along the edges of the "black" pixels are included in the blackout region 102. While the blackout region 102 is shown generally conforming to the shape of the graphic 120, the blackout region 102 may take on other shapes, including a rectangle surrounding the graphic 120.

In an embodiment, both the matrix 108 and the graphic 120 are digital representations of data. That is, the graphic is a bit map representing a human signature. Alternatively, the graphic 120 may be a vector drawing. Other techniques for creating the graphic 120 may also be used with the EVSBC 100. The matrix 108 is encoded around the graphic 120, or as background to the graphic 120. In this way, information related to the document carrying the EVSBC 100 is available for decoding by a decoder while a human may read the graphic 120. As a result, and using an appropriate decoder, a human user can authenticate a document on which the EVSBC 100 has been placed, and can verify that the EVSBC 100 has not, for example, been cut and pasted from another document. To properly decode the EVSBC 100, the decoder may access the information encoded into the EVSBC 100. In the case of a signature, the decoder may access a bit map representing the signature. To access the bit map, the decoder may access a password and an encryption key corresponding to the digital signature, for example.

Figure 5A:
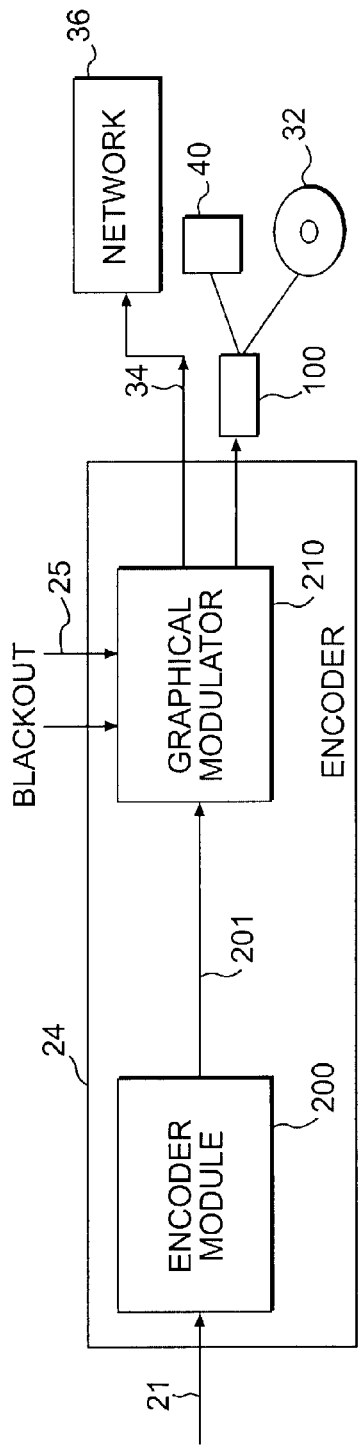
FIGS. 5A and 5B are block diagrams of components of the system of FIG. 2.

FIG. 5A is a block diagram of the encoder 24 (see FIG. 2) that generates the EVSBC 100. In FIG. 5A, the encoder 24 is shown comprising an encoder module 200 that receives feature information extracted from the transaction 21 and generates an encoding 201. The encoding 201 is provided to a modulator 210. Also provided to the modulator 210 are the graphic 25 and a corresponding blackout region. Using the graphic 25, the blackout region, and the encoding 201, the modulator 210 produces an encoded transaction in the form of the EVSBC 100. The EVSBC 100 may then be reproduced on the hard copy document 40, or on some other physical medium. Alternatively, the digital data representing the EVSBC 100 may be stored on a computer readable medium 32. In yet another embodiment, the EVSBC 100 may be transmitted over channel 34, and either stored or used in network 36.

Figure 5B:
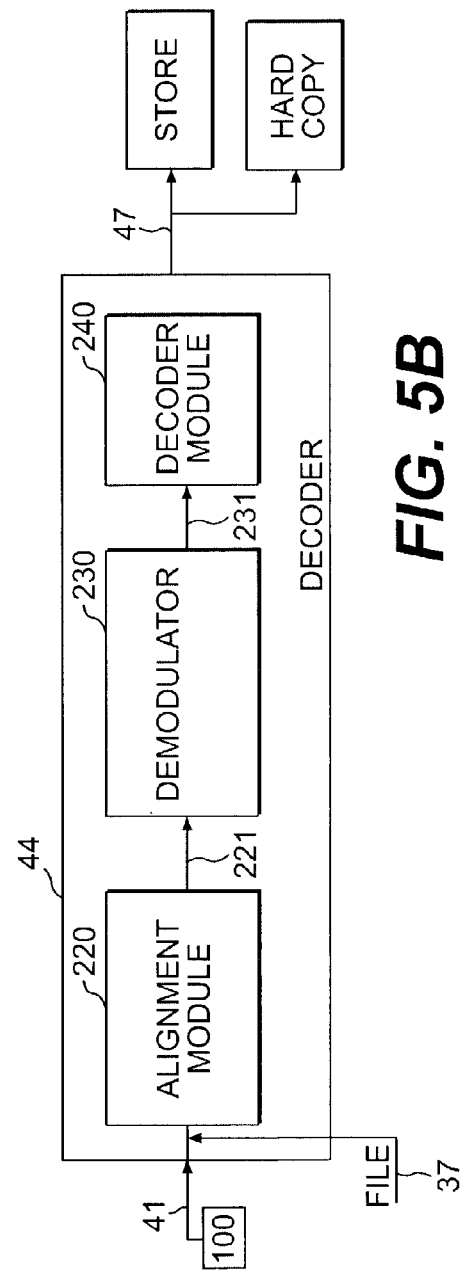

FIG. 5B is a block diagram of the decoder 44 (see FIG. 2) that may be used to decode the EVSBC 100. The decoder 44 includes an alignment module 220 that receives the digital bit stream 41. The digital bit stream 41 may be produced by the scanner 42 that reads the hard copy document 40 with the EVSBC 100. Alternatively, the digital bit stream 41 may be the digital data 37 from the computer-readable medium 32 or the network 36. The alignment module 220 ensures that the digital bit stream 41 is properly aligned prior to decoding. That is, the alignment module 220 ensures that the original digital bit map (the embedded graphic) can be located. The alignment module 220 provides a digital output 221 that is supplied to a demodulator 230. The demodulator 230 produces a demodulated output 231 comprising the original feature information and the graphic data 25. A decoder module 240 receives and decodes the demodulated output 231, producing the decoded output file 47, which may be rendered on a hard copy document, or stored in a digital format. The decoder module 240 may also use an ECC as needed to account for errors in the EVSBC 100.

The encoder module 200 of FIG. 5A and the decoder module 240 of FIG. 5B use specific algorithms to encode and decode, respectively, the digital bit map and graphic information. The encoding algorithm starts by generating a barcode from a random number. In an embodiment, the barcode is a two-dimensional gray-tone barcode. In another embodiment, the barcode is a one-dimensional gray-tone barcode. In still another embodiment, the barcode is a color barcode. One- and two-dimensional barcodes are will known in the art, and need not be described here in more detail.

Figure 6:
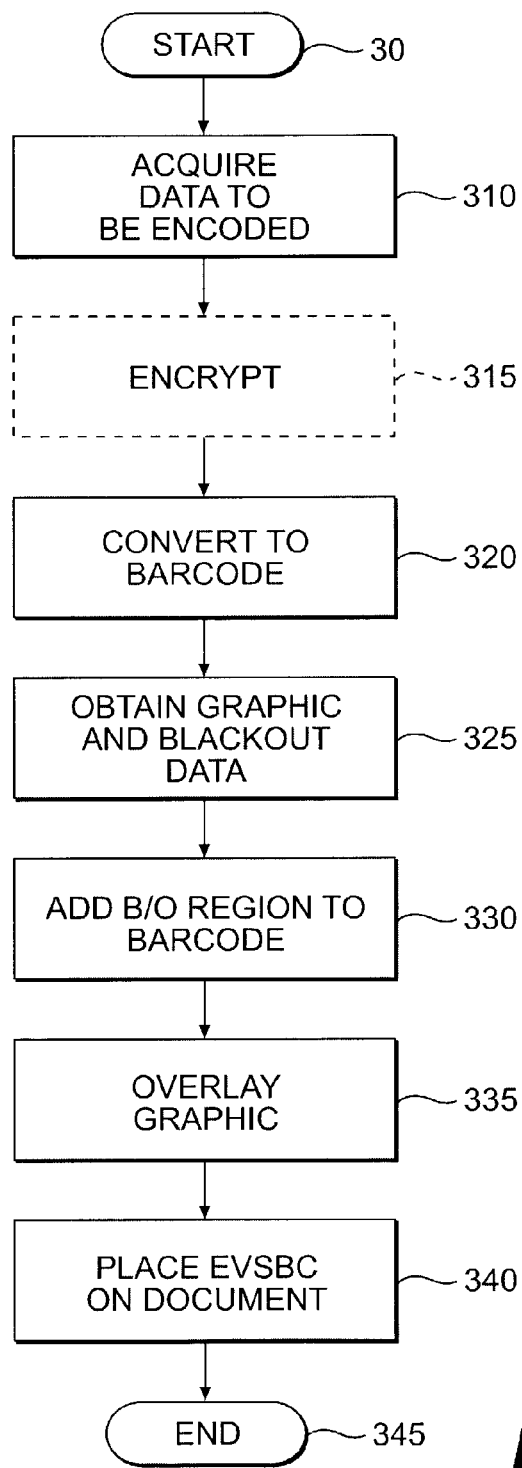
FIG. 6 is a flowchart showing exemplary methods for encoding the EVSBC.

FIG. 6 is a flowchart showing an exemplary operation 300 for encoding the EVSBC. The encoding operation 300 begins at block 305. In block 310, the encoder 24 acquires data to be encoded. The data may relate to a document, and allows a subsequent user of the document to verify its integrity, authenticity, etc. The data related to the document can be random, can relate to specific aspects of the document, and can be in any form that is verifiable. For example, an original document can have four paragraphs, with the number of words in each paragraph different. A check sum technique can be used to account for the total number of paragraphs (the check sum would be four (4)) and other check sums for the number of words in each paragraph. For example, if paragraph 1 contains 95 words, the check sum would be 14. Other techniques include recording specific information related to the document. The data to be encoded may be gathered from the document using some automatic means, such as a scanner and an appropriate algorithm. Alternatively, the data to be encoded may be entered manually into an application program associated with the overall encoding process.

In optional block 315, the encoder 24 encrypts the document data to produce a number. In block 320, the encoder 24 converts the number to a barcode, if the data has been encrypted, or converts the document data directly to the barcode if the optional encryption is not used. In an embodiment, the barcode thus produced is a two-dimensional barcode, and is rendered in black and white. In another embodiment, the barcode may be a one-dimensional barcode. In yet another embodiment, the barcode is rendered is rendered in a gray-scale format. In still another embodiment, the barcode is rendered in color.

In block 325, the encoder 24 obtains the graphic 25, which may be a representation of a signature, for example. The signature may reside at a trusted agent, and may be accessed by use of a private key infrastructure, for example. The signature may be provided to the encoding process as a digital bit map, or, alternatively, as a vector approximation of the human signature. Along with the graphic 25, the encoder 24 receives information related to the blackout region that will be created when the graphic 25 is overlaid on the barcode.

In block 330, the encoder 24 adds information to the barcode to account for the blackout region. For example, the encoder 24 may add reference points to the barcode. The reference points may be synchronization marks may be synchronization marks, such as start and stop points, or vector descriptions of the graphic 25. Use of the reference points will allow a subsequent decoding process to account for the presence of the digital signature while fully decoding the barcode, and may eliminate the need for error correcting code when decoding the barcode.

In block 335, the encoder 24 overlays the graphic 25 on to the barcode. In block 340, the encoder 24 places the barcode stamp (the EVSBC 100) on the document of interest. In block 345, the operation 300 ends.

Figure 7:
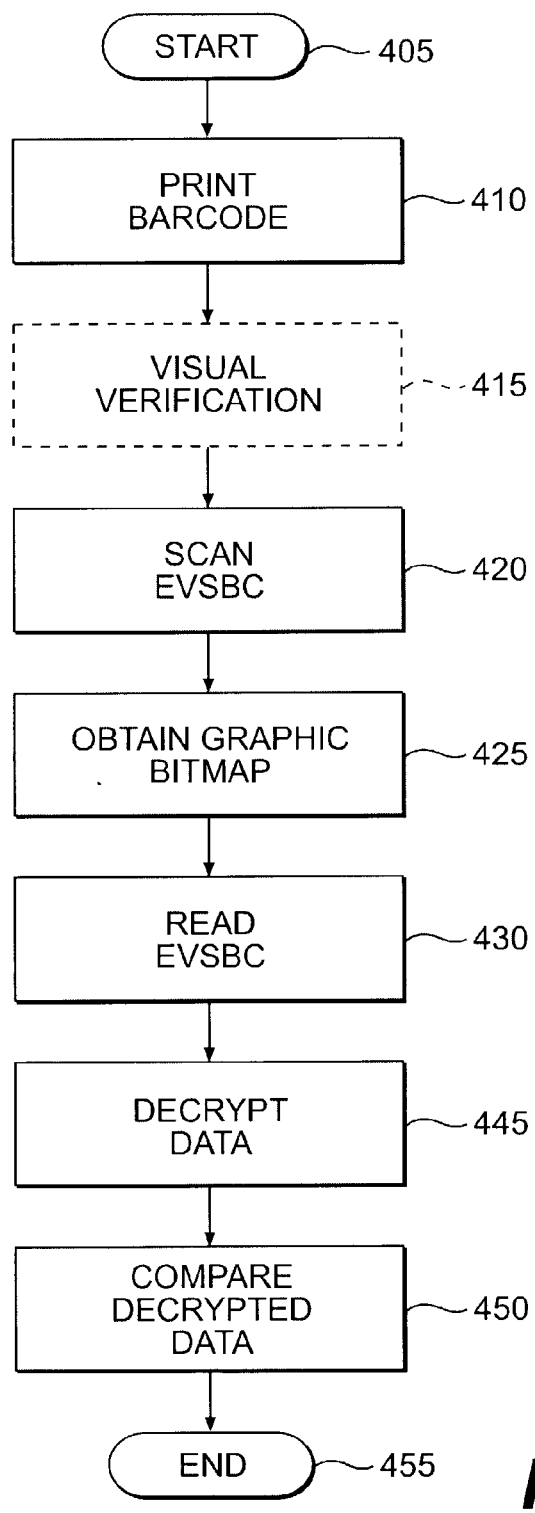
FIG. 7 is a flowchart showing exemplary methods for decoding the EVSBC.

FIG. 7 is a flowchart showing an exemplary operation 400 for decoding the EVSBC 100. The operation 400 starts at block 405. In block 410, the document with barcode stamp is printed. In optional block 415, a human visually verifies the signature (the graphic 25) that overlays the barcode portion of the EVSBC 100. In block 420, the EVSBC is scanned to produce a digital rendering of EVSBC 100 (barcode and signature). In block 425, the private key is used to obtain the bit map that represents the graphic 25.

In block 430, the decoder 44 reads the barcode using a barcode read algorithm to produce a number, subtracting out the graphic 25 from the EVSBC 100. As part of the read step, the decoder 44 may apply an error correcting code (ECC) to correct for areas obscured by the graphic 25 or to account for noise. More specifically, the decoder 44 may apply a color detection algorithm to perform a first separation step, assigning black, gray or white to each block in an n×m matrix (see FIG. 4). Next, the ECC is used to correct some or all color detection errors in accordance with procedures that are well known in the art. Since printers, scanners and copiers introduce noise into the EVSBC, most color errors will occur around edges of the embedded graphic 25.

In block 430, if the bit map is not used, the decoder 44 may use synchronization marks to locate the graphic 25 and to remove the effect of the graphic 25 from the barcode. Alternatively, the decoder 44 may apply graphic vector data to account for approximate position of signature, and to account for its presence. The decoder 44 then reads the barcode using the barcode read algorithm.

In block 445, the decoder 44 decrypts the encoded data. In block 450, the decrypted data is compared to the original document data. The comparison may be automated in the decoder 44, or an attached component. Alternatively, the comparison may be completed manually. In block 455 the operation 400 ends.

The invention claimed is:

1. A machine-implemented barcode method, comprising:
   obtaining barcode data;
   obtaining image data; and
   merging the barcode data and the image data into an enhanced visually significant barcode having image data presented graphically in blackout regions free of barcode data and having the barcode data presented graphically in regions outside of the blackout regions, wherein merging comprises graphically presenting at least one machine-readable reference mark encoding a respective location of at least one of the blackout regions.

2. The method of claim 1, wherein obtaining barcode data, comprises:
   obtaining data related to an item; and
   encoding the obtained item data into two-dimensional barcode data.

3. The method of claim 1, wherein at least one reference mark encodes a beginning point of a blackout region.

4. The method of claim 3, wherein at least one reference mark encodes an endpoint of a blackout region.

5. The method of claim 1, wherein the at least one reference mark is presented graphically on the enhanced visually significant barcode in regions outside of the blackout regions and free of barcode data.

6. The method of claim 1, further comprising reading the barcode data while avoiding blackout regions based at least in part on the location encoded by the machine-readable reference mark.

7. The method of claim 6, wherein the graphically presented image data includes an image of a handwritten signature, and further comprising: applying to the enhanced visually significant barcode at least one reference mark encoding a respective location of the signature.

8. The method of claim 6, further comprising visually verifying the signature.

9. The method of claim 1, wherein the image data obscures respective portions of the bar code data in the blackout regions.

10. A machine-implemented barcode method, comprising:
    obtaining barcode data;
    obtaining image data; and
    merging the barcode data and the image data into an enhanced visually significant barcode having image data presented graphically in blackout regions free of barcode data and having the barcode data presented graphically in regions outside of the blackout regions, wherein the graphically presented image data includes an image of a handwritten signature.

11. The method of claim 10, further comprising obtaining the signature from a trusted authority.

12. A machine-implemented barcode method, comprising:
    obtaining barcode data;
    obtaining image data;
    merging the barcode data and the image data into an enhanced visually significant barcode having image data presented graphically in blackout regions free of barcode data and having the barcode data presented graphically in regions outside of the blackout regions, wherein the graphically presented image data corresponds to a signature;
    obtaining the signature from a trusted authority; and
    removing the signature from the enhanced visually significant barcode; and
    reading the barcode data while avoiding blackout regions.

13. A barcode apparatus, comprising:
    an encoder configured to obtain barcode data and image data, and operable to merge the barcode data and the image data into an enhanced visually significant barcode having image data presented graphically in blackout regions and having the barcode data presented graphically in regions outside of the blackout regions, wherein the encoder is operable to provide at least one machine-readable reference mark encoding a respective location of at least one of the blackout regions.

14. The apparatus of claim 13, further comprising a decoder operable to read the barcode data while avoiding blackout regions based at least in part on the location encoded by the machine-readable reference mark.

15. The apparatus of claim 14, wherein the graphically presented image data includes an image of a handwritten signature.

16. The apparatus of claim 14, wherein the decoder is operable to locate blackout regions based on at least one reference mark contained in the enhanced visually significant barcode and encoding a respective location of one or more of the blackout regions.

17. The apparatus of claim 16, wherein the decoder is operable to read each reference mark and avoid the blackout regions whose locations are encoded by the reference marks read by the decoder.

18. A barcode apparatus, comprising:
    an encoder configured to obtain barcode data and image data, and operable to merge the barcode data and the image data into an enhanced visually significant barcode having image data presented graphically in blackout regions and having the barcode data presented graphically in regions outside of the blackout regions, wherein the graphically presented image data corresponds to a signature; and
    a decoder operable to read the barcode data while avoiding blackout regions, wherein the decoder is operable to obtain the signature from a trusted authority and to subtract the signature from the enhanced visually significant barcode.

19. The apparatus of claim 18, wherein the image data corresponds to a bit map image of the signature.

20. The apparatus of claim 18, wherein the image data corresponds to a vector representation of the signature.

21. A barcode with enhanced visual quality, comprising:
    image data presented graphically in blackout regions;
    barcode data presented graphically in regions outside of the blackout regions; and
    at least one machine-readable reference mark encoding a respective location of at least one of the blackout regions.

22. The barcode of claim 21, wherein the at least one reference mark is presented graphically in regions outside of the blackout regions and free of barcode data.

23. The barcode of claim 22, wherein at least one reference mark encodes a beginning point of a blackout region.

24. The barcode of claim 23, wherein at least one reference mark encodes an endpoint of a blackout region.

25. The barcode of claim 21, wherein the barcode data comprises data related to a document to which the enhanced visually significant barcode is affixed.

26. The barcode of claim 21, wherein the graphically presented image data corresponds to one or more of a signature, and identification code, a universal resource locator code, encrypted data, unencrypted data, and a logo.

27. A barcode with enhanced visual quality, comprising:
image data presented graphically in blackout regions;
barcode data presented graphically in regions outside of the blackout regions; and
at least one machine-readable reference mark locating at least one of the blackout regions, wherein at least one reference mark identifies a storage location of an image corresponding to the graphically presented image data.

28. A barcode with enhanced visual quality, comprising:
image data presented graphically in blackout regions;
barcode data presented graphically in regions outside of the blackout regions; and
at least one machine-readable reference mark locating at least one of the blackout regions, wherein at least one reference mark comprises a vector description of the graphically presented image data.

29. A system that encodes and decodes an enhanced, visually significant barcode, comprising:
an encoder operable to merge the barcode data and the image data into an enhanced visually significant barcode having image data presented graphically in blackout regions and having the barcode data presented graphically in regions outside of the blackout regions, the encoder being further operable to graphically present at least one machine-readable reference mark encoding a respective location of at least one of the blackout regions; and
a decoder operable to read the barcode data while avoiding blackout regions based on the at least one machine-readable reference mark.

30. The system of claim 29, wherein the encoder is operable to provide the at least on reference mark in regions outside of the blackout regions and free of barcode data.

31. The system of claim 29, wherein the enhanced, visually significant bar code comprises a two-dimensional barcode.

32. The system of claim 29, wherein the enhanced, visually significant barcode comprises a color barcode.

33. A system that encodes and decodes an enhanced, visually significant barcode, comprising:
an encoder operable to merge the barcode data and the image data into an enhanced visually significant barcode having image data presented graphically in blackout regions and having the barcode data presented graphically in regions outside of the blackout regions, the encoder being further operable to graphically present at least one machine-readable reference mark locating at least one of the blackout regions; and
a decoder operable to read the barcode data while avoiding blackout regions based on the at least one machine-readable reference mark, wherein at least one reference mark provided by the encoder identifies a storage location of a description of an image corresponding to the graphically presented image data, and wherein the decoder is operable to retrieve the image description from the storage location based on the at least one reference mark.

34. A system that encodes and decodes an enhanced, visually significant barcode, comprising:
an encoder operable to merge the barcode data and the image data into an enhanced visually significant barcode having image data presented a graphically in blackout regions and having the barcode data presented graphically in regions outside of the blackout regions, the encoder being further operable to graphically present at least one machine-readable reference mark locating at least one of the blackout regions; and
a decoder operable to read the barcode data while avoiding blackout regions based on the at least one machine-readable reference mark, wherein a reference mark identifies a given endpoint of a given blackout region by specifying a distance from a beginning point of the given blackout region to the given endpoint.

* * * * *